(12) United States Patent
Madanat (10) Patent No.: US 12,514,389 B2
(45) Date of Patent: Jan. 6, 2026

(54) PARTITIONED TABLEWARE

(71) Applicant: Sahar Madanat, Zarqa (JO)

(72) Inventor: Sahar Madanat, Zarqa (JO)

( * ) Notice: Subject to any disclaimer, the term of this patent is extended or adjusted under 35 U.S.C. 154(b) by 881 days.

(21) Appl. No.: 16/958,494

(22) PCT Filed: Jan. 8, 2018

(86) PCT No.: PCT/JO2018/050001
§ 371 (c)(1),
(2) Date: Jun. 26, 2020

(87) PCT Pub. No.: WO2019/135263
PCT Pub. Date: Jul. 11, 2019

(65) Prior Publication Data
US 2021/0059442 A1    Mar. 4, 2021

(51) Int. Cl.
*A47G 19/06* (2006.01)
*A47G 19/03* (2006.01)

(52) U.S. Cl.
CPC .............. *A47G 19/06* (2013.01); *A47G 19/03* (2013.01); *A47G 2200/042* (2013.01); *A47G 2200/046* (2013.01)

(58) Field of Classification Search
CPC .. A47G 19/06; A47G 19/03; A47G 2200/042; A47G 2200/046; A47J 47/005; A47J 43/287
USPC ............................................ 220/575; 83/762
See application file for complete search history.

(56) References Cited

U.S. PATENT DOCUMENTS

| 2,094,257 | A | * | 9/1937 | Luck ........................ B65D 1/34 220/574 |
| D198,386 | S | * | 6/1964 | Neuberg ......................... D7/683 |
| 5,176,282 | A |   | 1/1993 | Rapaz |
| 5,580,037 | A |   | 12/1996 | Gore |
| 6,047,845 | A |   | 4/2000 | Rapaz |
| 6,206,356 | B1 | * | 3/2001 | Beloff ................... A47J 47/005 269/302.1 |
| 2011/0232441 | A1 | * | 9/2011 | Aguirre ................. A47J 47/005 83/35 |

FOREIGN PATENT DOCUMENTS

| CA | 2284336 A1 | 3/2001 |
| GB | 2265816 A | 10/1993 |
| KR | 20130006657 | 11/2013 |

OTHER PUBLICATIONS

"Tangent." Merriam-Webster.com Dictionary, Merriam-Webster, https://www.merriam-webster.com/dictionary/tangent. Last accessed May 16, 2025.*

(Continued)

*Primary Examiner* — Andrew D Perreault
(74) *Attorney, Agent, or Firm* — Oblon, McClelland, Maier & Neustadt, L.L.P.

(57) ABSTRACT

A partitioned tableware including abase (1), a wall (2) extending from the base (1) defining a first space gap (3), the wall (2) has a lower edge (20) and an upper edge (21), the lower edge (20) being tangent to the base (1), a lip (4) extending radially outwardly from the wall (2), and a first partitioning member (5) and a second partitioning member (6) with a second space gap (7) between them.

18 Claims, 7 Drawing Sheets

(56) References Cited

OTHER PUBLICATIONS

Editors of the American Heritage Dictionaries (Ed.). (2016). The American Heritage(R) Dictionary of the English Language (6th ed.). Houghton Mifflin. https://search.credoreference.com/articles/Qm9va0FydGljbGU6NDkzNjcwNQ==?aid=279753. Last accessed on May 16, 2025.*

"Tangent, Adj., Sense 1.a." Oxford English Dictionary, Oxford UP, Jun. 2024, https://doi.org/10.1093/OED/1871183345. Last accessed on May 16, 2025.*

Australian Patent Office; International Search Report & Written Opinion for PCT/JO2018/050001; Mar. 23, 2018; 9 pages.

Madanat, Sahar, "Featured item. One-handed-plate" [online]; Jun. 20, 2017; Retrieved from the internet: <http://www.herskhazeen.com/sahar_madanat-interview/>; Introduction "Studio Initiated 2015"; Figures, as well as video.

European Patent Office; Search Report & Written Opinion for EP18898929; Jun. 29, 2021; 6 pages.

A'Design Award & Competition, "One-Handed Plate Set Tableware," Feb. 26, 2015, 3 pages, downloaded from https://competition.adesignaward.com/design.php?ID=39889.

\* cited by examiner

PARTITIONED TABLEWARE

TECHNICAL FIELD

The present disclosure relates to a partitioned tableware, and more particularly to a partitioned tableware that allows users with mobility/dexterity impairments or situational needs (such as an occupied hand) to eat independently by facilitating cutting, chopping, and scooping food items.

BACKGROUND INFORMATION

In certain circumstances, people experience difficulty with handling food during meals and/or cannot have their meals using their two hands due to partial disability, such as temporary or permanent dexterity or mobility impairments, or a particular situation when one hand is engaged with something else. Those people may depend on others to cut and scoop food items for them, may use specialized cutlery, or limit their meal choices to food items that are easier to handle, which might be inconvenient for them.

For this reason, attempts to develop a tableware that allows people to chop food items and scoop bites independently has been done in the art. For instance, a conventional partitioned square-shaped plate has been developed that includes an L-shaped partition having two openings, wherein the partition is configured to divide the plate into two areas, a small area and a large area. The small area is configured to receive a food item that needs chopping, wherein a user may chop such a food item by allowing a knife's cutting edge to pass through the openings against a part of that food item.

The partition in the conventional plate divides the plate into two areas, which provides limitations on the sizes of the food items that need to be chopped. Also, the conventional plate traps the cut/chopped food items in a corner rendering the reachability to such food items difficult. Additionally, cleaning the corner may be difficult, which may impose hygienic issues.

SUMMARY

Aspects of the present disclosure provide a partitioned tableware that allows users who find handling food difficult due to partial disability, such as temporary or permanent dexterity or mobility impairments, or a particular situation when one hand is engaged with something else, to chop and cut food items into smaller pieces (e.g., of a bite size) and scoop them independently.

In aspects of the present disclosure, there is provided a partitioned tableware including:
  A base with an upper surface and a lower surface;
  A wall extending from the base with a lower edge and an upper edge, the lower edge may be tangent to the base;
  A lip extending radially outwardly from the wall; and
  A first partitioning member and a second partitioning member adjacent to each other with a space gap between them.

In some aspects, the partitioned tableware may further include two or more notches aligned with the space gap.

In aspects of the present disclosure, the upper edge of the wall may include a protrusion.

In aspects of the present disclosure, the lip may extend from a proximal position to the wall's upper edge.

In other aspects, the lip may provide a support surface for a cutlery set when such set is not in use.

In aspects of the present disclosure, the first partitioning member and the second partitioning member may be perpendicular to the base.

In other aspects, the first partitioning member, second partitioning member, and wall may provide support surfaces to scoop food items against.

In other aspects, the dimensions of the space gap may allow a knife or chopping utensil to pass through such space gap.

In aspects of the present disclosure, a food items may be chopped or cut by passing a cutting edge of a knife or a chopping utensil through the space gap while allowing such cutting edge to become in contact with the food items.

In other aspects, the partitioned tableware of the present disclosure may be made of any suitable food safe material selected from the group of glass, ceramic, porcelain, plastic, stainless steel, or a disposable material such as paper.

In yet other aspects of the present disclosure, the lower surface of the base may include a slip-proof member.

In some aspects, the slip-proof member may be built-in with the lower surface of the base.

In other aspects, the slip-proof member may be added on the lower surface of the base.

In other aspects, the slip-proof member is removable from the lower surface of the base.

BRIEF DESCRIPTION OF THE DRAWINGS

Aspects of the present disclosure will now be described with reference to the accompanying drawings, which illustrate embodiments of the present disclosure, without limiting the scope of thereof, and in which.

DETAILED DESCRIPTION

The term "tableware" used herein refers to any type of container that allows a user to scoop in and eat food items from, including but not limited to, dining plates, dishes, bowls, lunchboxes, snack boxes, food containers, and food packages, unless otherwise stated.

FIGS. 1-7 illustrate a partitioned tableware configured in accordance with embodiments of the present disclosure. The partitioned tableware of the present disclosure may allow users who have difficulty having their meals to chop and cut food items into smaller pieces and scoop them independently, for example, due to partial disability, such as temporary or permanent upper limb dexterity or mobility impairments, or a particular situation when one hand is engaged with something else.

In accordance with embodiments of the present disclosure, the partitioned tableware may include a base 1 with a central axis 10, a lower surface 11 and an upper surface 12; a wall 2 with a lower edge 20 and an upper edge 21, the wall 2 may be connected to the upper surface 12 of the base 1 to define a first space gap 3; a lip 4 extending radially outwardly from the wall's upper edge 21; a first partitioning member 5 with a first edge 50, a second edge 51, an upper edge 52, and a lower edge 53; a second partitioning member 6 with a first edge 60, a second edge 61, an upper edge 62, and a lower edge 63, wherein the first partitioning member 5 and the second partitioning member 6 may be spaced apart to define a second space gap 7. The partitioned tableware may further include one or more notches 8a, 8b, wherein the one or more notches 8a, 8b may be aligned with the second space gap 7.

In embodiments of the present disclosure, the wall 2 may extend substantially vertically from the base upper surface 12, wherein the wall's lower edge 20 may be tangent to the base's upper surface 12.

In some embodiments, the wall 2 may have a tapered shape as moving from the upper edge 21 to the lower edge 20.

In other embodiments, the displacement from the central axis 10 to either the lower edge 20 or the upper edge 21 may be similar.

Figure 5:
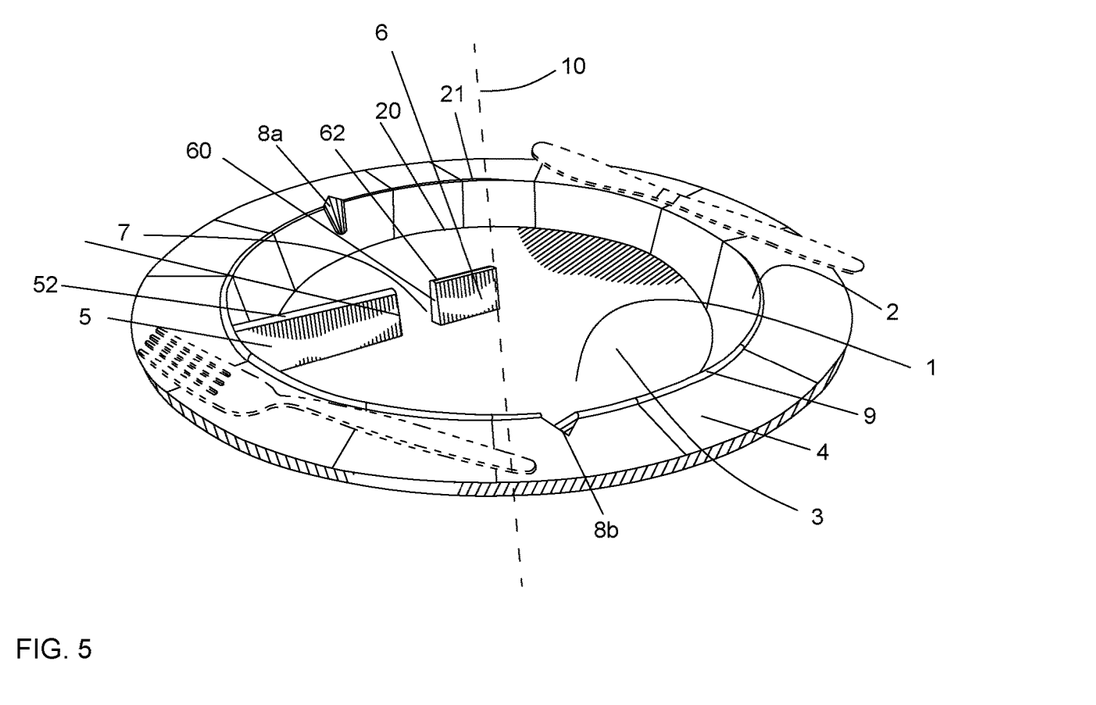
FIG. 5 illustrates a perspective view of a partitioned tableware with cutlery placed on a partitioned tableware lip configured in accordance with embodiments of the present disclosure.

In embodiments of the present disclosure, the lip 4 may extend from a position that is proximal to the wall's upper edge 20, and may be configured to provide a support surface for cutlery when the cutlery is not in use, such as shown in FIG. 5.

In embodiments of the present disclosure, the wall's upper edge 21 may have a relatively small protrusion 9, which may provide additional support to cutlery by preventing them from slipping into the first space gap 3, such as shown in FIG. 5.

In embodiments of the present disclosure, the first space gap 3 may be configured to receive one or more food items, and may include the first partitioning member 5, the second partitioning member 6, and the second space gap 7, wherein the first edges 50, 60 may be parallel and adjacent to one another with the second space gap 7 defined between them. The second edge 61 of the second partitioning member 6 may be parallel to the central axis 10. The second edge 51 of the first partitioning member 5 may be tangential to the wall 2, while the lower edges 53, 63 of the first and second partitioning members 5, 6, respectively, may be tangential to the upper surface 12 of the base 1. In embodiments of the present disclosure, the upper edges 52, 62 of the first and second partitioning members 5, 6, respectively, may be aligned with the wall's upper edge 21.

In other embodiments, the upper edges 52, 62 of the first and second partitioning members 5, 6, respectively, may be not aligned with the wall's upper edge 21.

In embodiments of the present disclosure, the second edge 61 of the second partitioning member 6 may be aligned with the central axis 10.

In other embodiments, the second edge 61 of the second partitioning member 6 may not be aligned with the central axis 10.

Figure 6:
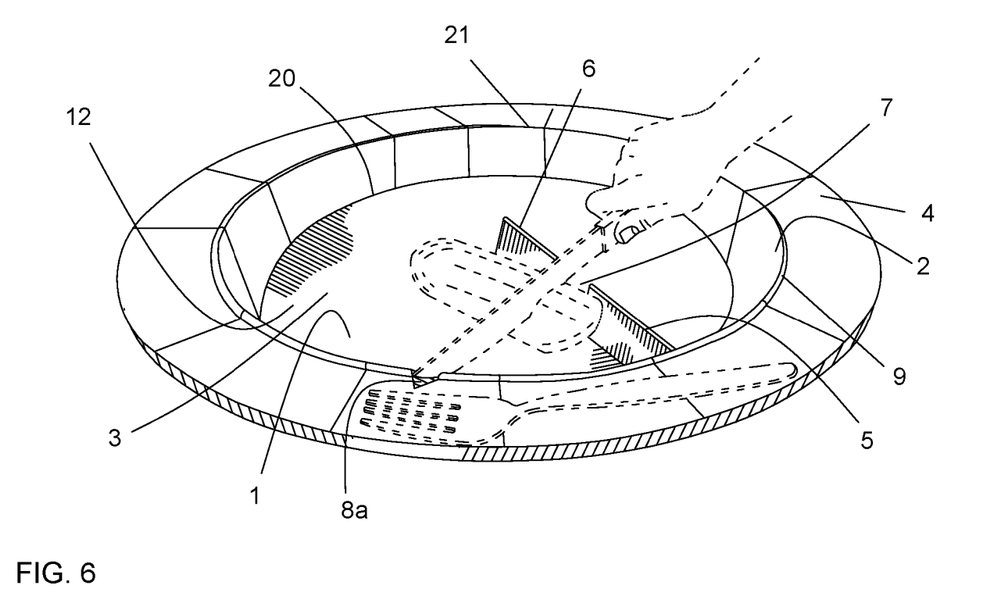
FIG. 6 illustrates a perspective view of a partitioned tableware with a food item and a knife, the partitioned tableware being configured in accordance with embodiments of the present disclosure.
Figure 7:
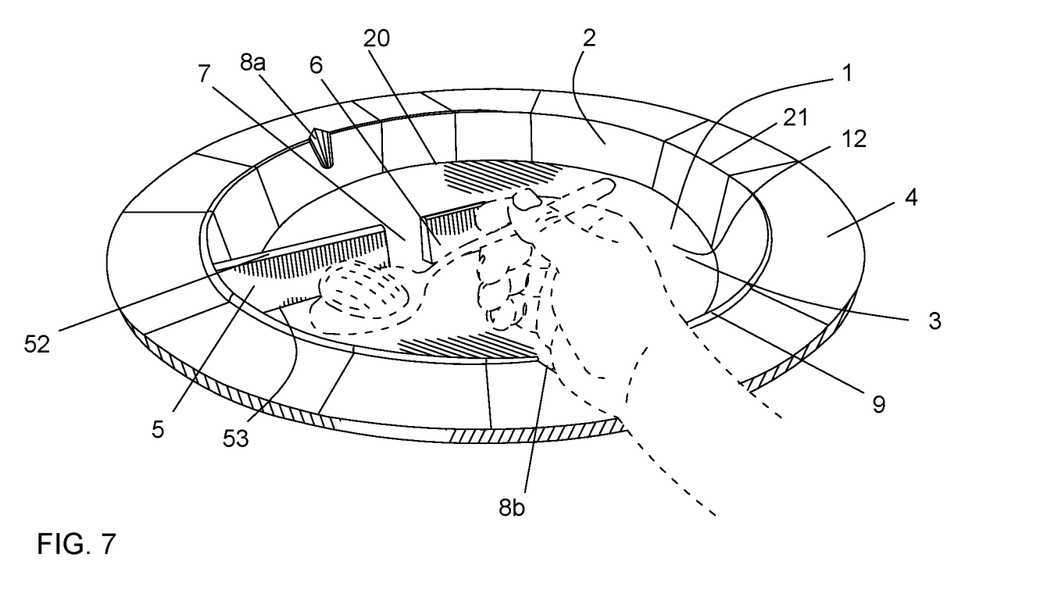
FIG. 7 illustrates a perspective view of a partitioned tableware with a food item being scooped in a spoon, the partitioned tableware being configured in accordance with embodiments of the present disclosure.

In embodiments of the present disclosure, the wall 2, the first partitioning member 5, and the second partitioning member 6 may be configured to provide support surfaces to facilitate scooping of food items, such that a user may force one or more food items being scooped against any one of the wall 2, first partitioning member 5 (as shown in FIG. 6), second partitioning member 6, or a combination thereof.

In embodiments of the present disclosure, the displacement between the first edges 50, 60 of the first and second partitioning members 5, 6, respectively, may be configured to allow a knife or any other cutting utensil from passing through the second space gap 7. Food items contained in the tableware of the present disclosure may be chopped or cut by passing the knife or cutting utensil through the second space gap 7 against such food items, while the first and second partitioning members 5, 6 stabilize the food items in place while it is being cut.

The notches 8a, 8b may provide auxiliary means for vision impaired users or users with vision problems to indicate the position of the second space gap 7, thus facilitating the chopping or cutting process in a safe manner without harming themselves. In embodiments of the present disclosure, a user with a vision problem may move the knife or cutting utensil with its cutting edge facing the base 1 across the wall's upper edge 21 till it drops in any of the notches 8a, 8b, then he/she could simply move the knife downward towards the base 1, and the knife would pass through the second space gap 7 and chop or cut the food items. Additionally, the notches 8a, 8b may be useful for users who have a lack of strength or dexterity needed to adequately cut or chop a food item by assisting the cutting or chopping process by acting as a guide for the knife or other cutting utensil.

Each of the first partitioning member 5 and the second partitioning member 6 may have a rectangular, trapezoidal, or any other regular or irregular shape.

The tableware in embodiments of the present disclosure may be made of a food safe material such as plastic, porcelain, ceramic, glass, stainless steel, or any other suitable disposable material such as paper.

While the drawings illustrate circular-profiled tableware, other embodiments may include oval, polygonal, or any other shaped tableware.

It should be appreciated that the numbers of the partitioning members, notches, and space gaps disclosed herein are exemplary only, and do not limit the scope of disclosure to two partitioning members only defining one space gap therebetween.

Figure 1:
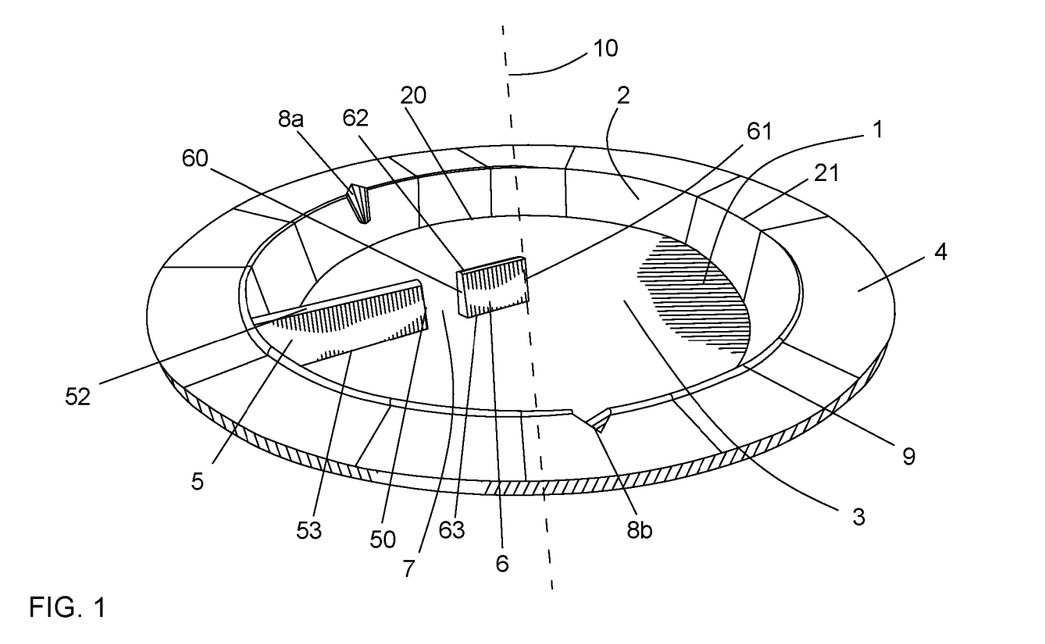
FIG. 1 illustrates a frontal perspective view of a partitioned tableware configured in accordance with embodiments of the present disclosure.
Figure 2:
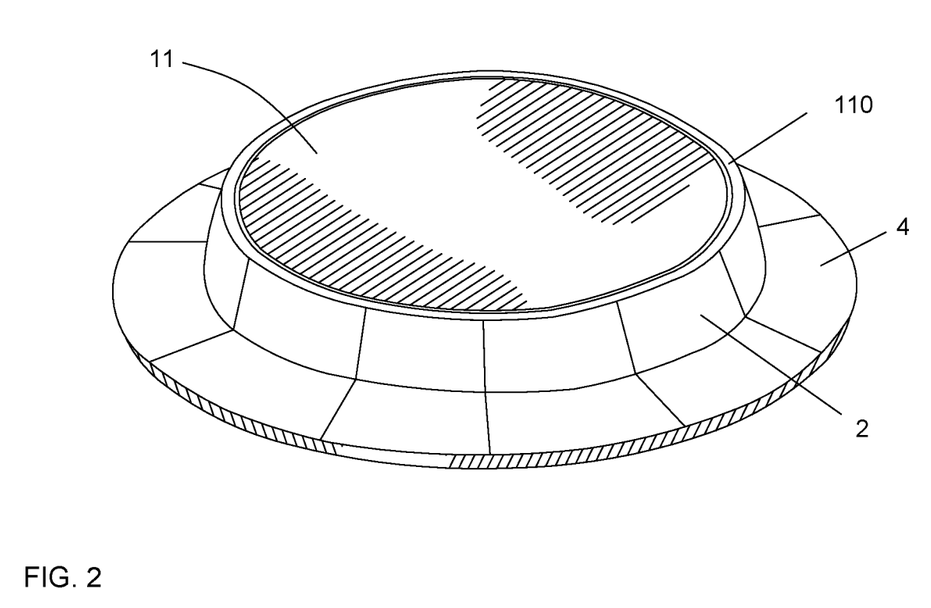
FIG. 2 illustrates a rear perspective view of a partitioned tableware configured in accordance with embodiments of the present disclosure.
Figure 3:
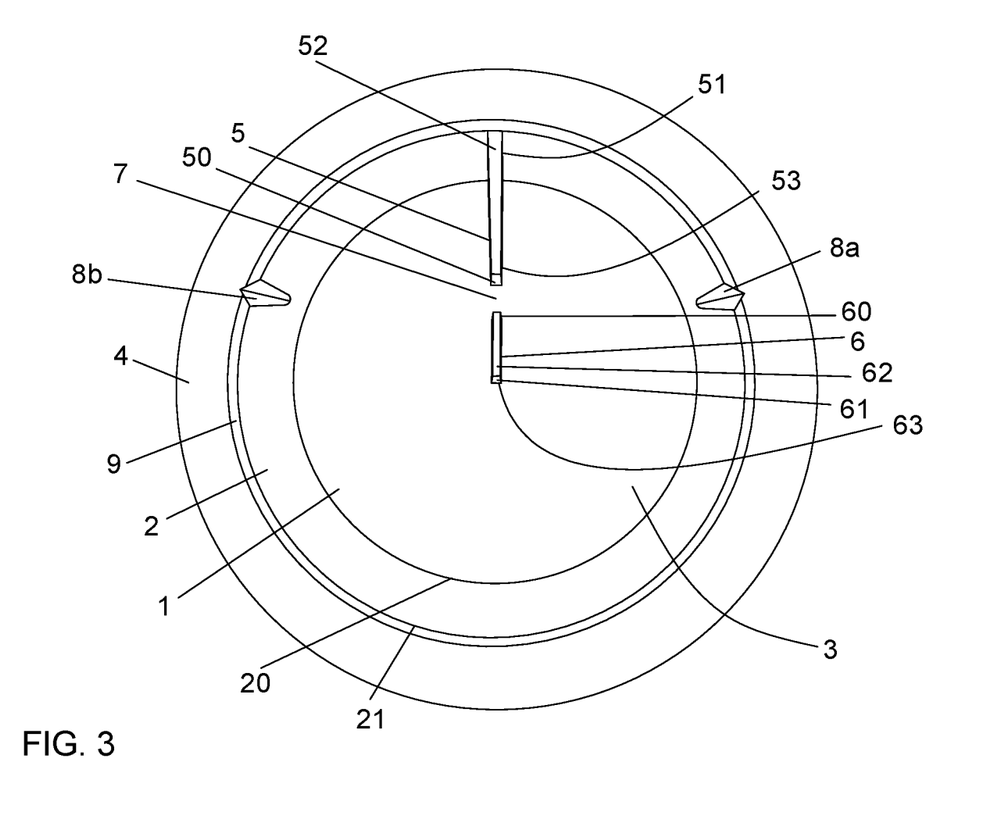
FIG. 3 illustrates a top view of a partitioned tableware configured in accordance with embodiments of the present disclosure.
Figure 4:
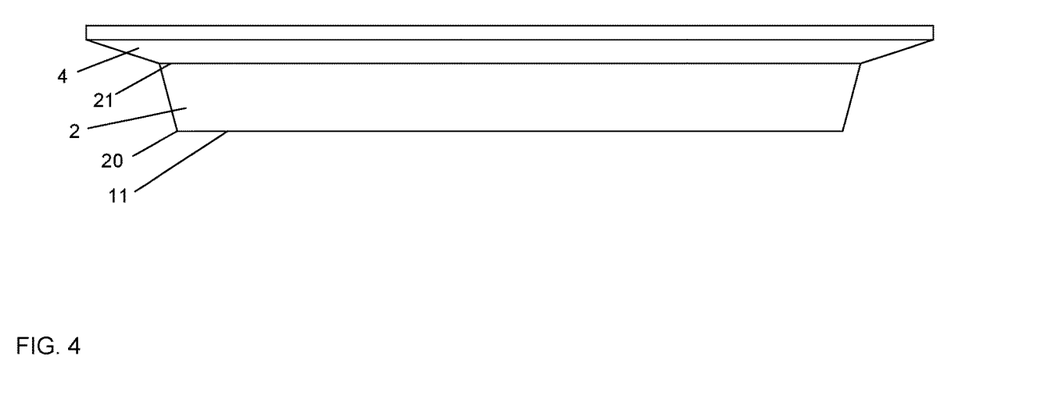
FIG. 4 illustrates a side view of a partitioned tableware configured in accordance with embodiments of the present disclosure.

Referring to FIG. 2, in embodiments of the present disclosure, the lower surface 11 of the base 1 may include a slip-proof member 110, such as, but not limited to, a non-slip ring or a non-slip mat, wherein such slip-proof member 110 prevents the tableware from skidding or sliding over a table or other support surface when in use, especially with one-handed users.

In embodiments of the present disclosure, the slip-proof member 110 may be built-in with the lower surface 11 of the base 1.

In other embodiments, the slip-proof member 110 may be added on the lower surface 11 of the base 1, and/or may be removable In some embodiments, the slip-proof member 110 may cover all the lower surface 11 of the base 1.

In other embodiments, the slip-proof member 110 may partially cover the lower surface 11 of the base 1.

It should be also appreciated that additions to the embodiments of the present disclosure may include lids/covers or a skid proof material and such additions are considered within the scope of the present disclosure.

The use of the term "and" in the claims is used to mean "and/or" unless explicitly indicated to refer to collective nature only.

As used herein with respect to an identified property or circumstance, "substantially" refers to a degree of deviation that is sufficiently small so as to not measurably detract from the identified property or circumstance. The exact degree of deviation allowable may in some cases depend on the specific context.

While the present disclosure has been made in detail and with reference to specific embodiments, it will be apparent to those skilled in the art that various additions, omissions, or amendments can be made without departing from the scope and spirit thereof.

What is claimed is:

1. A partitioned tableware, comprising:
  a planar base with an upper surface and a lower surface, the upper surface directed upwardly when the partitioned tableware is placed on a table top and the lower surface being configured to contact the table top;
  a wall extending from the base with a lower edge and an upper edge, the lower edge contacting the upper surface of the base so as to encompass the base;
  a first partitioning member and a second partitioning member, both extending upwardly from the upper surface of the base, wherein the first partitioning member and the second partitioning member are aligned to form a space gap between them; and
  wherein the first partitioning member has an upper edge, a lower edge, a first edge, and a second edge, the first edge of the first partitioning member bordering the space gap and the second edge of the first partitioning member bordering the wall,
  wherein the second partitioning member has an upper edge, a lower edge, a first edge and a second edge, the first edge of the first partitioning member bordering the space gap,
  wherein the first partitioning member and the second partitioning member are collinearly aligned and each extends upwardly from the upper surface of the base to the upper edge,
  wherein the space gap runs from the upper edge of the first partitioning member to the upper edge of the second partitioning member and from the lower edge of the first partitioning member to the lower edge of the second partitioning member,
  wherein the space gap is configured to receive a cutting edge of a knife or a chopping utensil,
  wherein the second edge of the second partitioning member is collinear with a central axis extending orthogonally from a center of the upper surface of the base, and
  wherein the lower edges of the first and second partitioning members directly contact the upper surface of the base.

2. The partitioned tableware of claim 1, further comprising:
  a first notch formed in the wall and substantially aligned with the space gap, wherein the first notch provides the auxiliary manner for vision impaired users to indicate a position of the space gap.

3. The partitioned tableware of claim 1, further comprising:
  a lip configured to provide a support surface suitable for holding a cutlery set when the cutlery set is not in use.

4. The partitioned tableware of claim 1, wherein the upper edge of the wall includes a protrusion.

5. The partitioned tableware of claim 4, wherein the protrusion is configured to support cutlery by preventing them from slipping from the lip towards the space gap.

6. The partitioned tableware of claim 1, wherein the first partitioning member, second partitioning member, and the wall are configured to provide support surfaces against which to cut and scoop food items.

7. The partitioned tableware of claim 1, wherein dimensions of the space gap are configured to allow a cutting edge of a knife or chopping utensil to pass through the space gap.

8. The partitioned tableware of claim 1, wherein the lower surface of the base comprises
  a slip-proof member built-in with the lower surface of the base,
  a slip-proof member, which is removable from the lower surface of the base, or
  a slip-proof member added on the lower surface of the base.

9. The partitioned tableware of claim 1, comprising no further partitioning member than the first partitioning member and the second partitioning member.

10. The partitioned tableware of claim 1, wherein the first and/or second partitioning member has a rectangular or trapezoidal cross-sectional shape.

11. The partitioned tableware of claim 1, wherein the upper surface of the base is configured to be planar parallel to a table or other support surface in use.

12. The partitioned tableware of claim 1, wherein only the first and second partitioning members and the wall contact the upper surface of the base.

13. The partitioned tableware of claim 1, comprising no further space gap than the space gap and optionally a second space gap.

14. The partitioned tableware of claim 2, further comprising:
  a second notch formed in the wall and substantially aligned with the space gap, wherein the second notch provides a further auxiliary manner for vision impaired users to indicate the position of the space gap.

15. The partitioned tableware of claim 1, wherein the partitioned tableware is made of ceramic or porcelain.

16. The partitioned tableware of claim 1, wherein the partitioned tableware is made of stainless steel.

17. The partitioned tableware of claim 1, wherein the partitioned tableware comprises plastic and/or paper.

18. The partitioned tableware of claim 1, wherein all of the upper edges of the partitioning members are parallel to each other.

* * * * *